(12) United States Patent
Sato et al.

(10) Patent No.: US 10,046,751 B2
(45) Date of Patent: Aug. 14, 2018

(54) ELECTROMOTIVE VEHICLE

(71) Applicant: Toyota Jidosha Kabushiki Kaisha, Toyota-shi, Aichi-ken (JP)

(72) Inventors: Shun Sato, Toyota (JP); Takahiko Tsutsumi, Nisshin (JP); Toshio Sugimura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 15/180,755

(22) Filed: Jun. 13, 2016

(65) Prior Publication Data

US 2016/0368488 A1 Dec. 22, 2016

(30) Foreign Application Priority Data

Jun. 16, 2015 (JP) .................. 2015-120846

(51) Int. Cl.
| | |
|---|---|
| *B60W 10/11* | (2012.01) |
| *B60W 10/06* | (2006.01) |
| *B60W 10/08* | (2006.01) |
| *B60W 30/18* | (2012.01) |
| *B60W 30/19* | (2012.01) |
| *B60K 6/48* | (2007.10) |

(52) U.S. Cl.
CPC ............ *B60W 10/11* (2013.01); *B60K 6/48* (2013.01); *B60W 10/06* (2013.01); *B60W 10/08* (2013.01); *B60W 30/18127* (2013.01); *B60W 30/18136* (2013.01); *B60W 30/19* (2013.01); *B60K 2006/4825* (2013.01); *B60W 2510/244* (2013.01); *B60W 2710/085* (2013.01); *B60Y 2200/92* (2013.01); *Y02T 10/6221* (2013.01); *Y02T 10/6252* (2013.01); *Y02T 10/6286* (2013.01); *Y02T 10/7258* (2013.01); *Y10S 903/919* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2007/0111848 A1 | 5/2007 | Tabata et al. | |
| 2015/0283993 A1* | 10/2015 | Takano | B60K 6/48 701/22 |

FOREIGN PATENT DOCUMENTS

| | | |
|---|---|---|
| JP | H09150638 A | 6/1997 |
| JP | 2007-001451 A | 1/2007 |
| JP | 2007-284005 A | 11/2007 |
| JP | 2009-165289 A | 7/2009 |
| JP | 2013-141862 A | 7/2013 |

* cited by examiner

Primary Examiner — Jacob S. Scott
(74) Attorney, Agent, or Firm — Dinsmore & Shohl LLP

(57) ABSTRACT

An electromotive vehicle includes: an electrical storage device; a rotary electric machine; a transmission device; an engine; and an electronic control unit. The electronic control unit is configured to, when decelerating force acts on the vehicle due to engine brake force of the engine and upshift control is executed in the transmission device and when an upper limit value of input electric power that is allowed at the time of charging the electrical storage device is smaller than a threshold, control the rotary electric machine such that torque of the rotary electric machine gradually increases by the time the upshift control completes, at which the decelerating force that acts on the vehicle becomes decelerating force reduced as a result of the upshift control.

4 Claims, 5 Drawing Sheets

ELECTROMOTIVE VEHICLE

CROSS-REFERENCE TO RELATED APPLICATIONS

This application claims priority to Japanese Patent Application No. 2015-120846 filed on Jun. 16, 2015, the entire contents of which are hereby incorporated by reference.

BACKGROUND

1. Field

The disclosure relates to an electromotive vehicle including a transmission device and, more particularly, to control over braking force that acts on a vehicle at the time of an upshift.

2. Description of Related Art

In an electromotive vehicle that uses a motor generator as a drive source, a transmission device may be provided in a power transmission path between the drive source and a drive wheel. As such an electromotive vehicle, for example, Japanese Patent Application Publication No. 2009-165289 (JP 2009-165289 A) describes a control apparatus for a vehicle. When a regeneration request has been issued at the time of an upshift, the control apparatus outputs torque such that the torque is gradually changed from a negative torque that is output from the motor generator at the end of the shift to a target negative torque and sets the output gradient of the torque in response to a time that is taken from the regeneration request to the end of the shift.

For example, when a low speed-side speed ratio is established in the transmission device, if the rotation speed of the motor generator reaches an upper limit value that takes durability into consideration, the rotation speed of an input shaft of the transmission device may be decreased by upshifting the speed ratio of the transmission device. In this case, decelerating force of the vehicle may change as a result of upshifting the speed ratio of the transmission device. For such inconvenience, it is conceivable to prevent or reduce a change in the decelerating force of the vehicle by changing the negative torque that is output from the motor generator as in the case of the control apparatus for a vehicle, described in JP 2009-165289 A. However, if the input electric power of a battery is limited, it may be difficult to generate a negative torque that is required to prevent or reduce the change in decelerating force. For this reason, when decelerating force changes as a result of an upshift, the drivability of the vehicle may deteriorate.

SUMMARY

The disclosure provides an electromotive vehicle that gently changes decelerating force as a result of an upshift.

An aspect of the disclosure provides an electromotive vehicle. The electromotive vehicle includes: an electrical storage device; a rotary electric machine serving as a drive source of a vehicle and a generating source for generating electric power, the rotary electric machine being configured to exchange electric power with the electrical storage device; a transmission device including an input shaft and an output shaft, a rotary shaft of the rotary electric machine being connected to the input shaft, a drive wheel being connected to the output shaft, the transmission device being configured to be able to change a rotation speed of the input shaft and then transmit the changed rotation speed to the output shaft; an engine serving as a drive source of the vehicle, the engine being connected to the input shaft of the transmission device; and an electronic control unit configured to control an operation of the rotary electric machine and an operation of the transmission device. The electronic control unit is configured to, when decelerating force acts on the vehicle due to engine brake force of the engine and upshift control is executed in the transmission device and when an upper limit value of input electric power that is allowed at the time of charging the electrical storage device is smaller than a threshold, control the rotary electric machine such that torque of the rotary electric machine gradually increases by the time the upshift control completes, at which the decelerating force that acts on the vehicle becomes decelerating force reduced as a result of the upshift control.

With this configuration, when the upshift control is executed and the upper limit value of input electric power that is allowed at the time of charging the electrical storage device is smaller than the threshold, the rotary electric machine is controlled such that the torque of the rotary electric machine gradually increases by the time the upshift control completes, at which the decelerating force that acts on the vehicle becomes decelerating force reduced as a result of the upshift control. Therefore, it is possible to gently change the decelerating force of the vehicle, which changes as a result of the upshift. As a result, it is possible to reduce deterioration of drivability of the vehicle.

The electronic control unit may be configured to, when the rotation speed of the rotary electric machine reaches a rotation speed threshold lower than a rotation limit value, execute the upshift control.

With this configuration, at the time when an upshift that is not intended by a driver is carried out, it is possible to gently change the decelerating force of the vehicle, which changes as a result of the upshift, by gradually increasing the torque of the rotary electric machine in advance.

The electronic control unit may be configured to, when the upper limit value is larger than the threshold in the case where the upshift control is executed, allow generation of negative torque that is output from the rotary electric machine.

With this configuration, when the upper limit value of input electric power is larger than the threshold in the case where the upshift control is executed, generation of negative torque that is output from the rotary electric machine is allowed. Therefore, it is possible to reduce a change in decelerating force that occurs as a result of the upshift.

The electronic control unit may be configured to control the rotary electric machine such that torque output of the rotary electric machine stops at the same time as the upshift control completes.

With this configuration, after completion of the upshift control, it is possible to reduce a change in decelerating force that acts on the vehicle. Specifically, when the torque output of the rotary electric machine is stopped in a state where the torque of the rotary electric machine is increased, decelerating force changes to increase. On the other hand, when an upshift is carried out, decelerating force changes to reduce. Therefore, when the torque output of the rotary electric machine is stopped at the same time as the upshift completes, it is possible to gently change decelerating force, which reduces as a result of an upshift, by stopping the torque output of the rotary electric machine. As a result, it is possible to reduce a change in decelerating force that acts on the vehicle.

According to the disclosure, when the upshift control is executed and when the upper limit value of input electric power that is allowed at the time of charging the electrical storage device is smaller than the threshold, the rotary electric machine is controlled such that the torque of the rotary electric machine gradually increases by the time the upshift control completes, at which decelerating force that acts on the vehicle becomes decelerating force reduced as a result of the upshift control. Therefore, it is possible to gently change the decelerating force of the vehicle, which changes as a result of an upshift. As a result, it is possible to reduce deterioration of drivability of the vehicle. Therefore, it is possible to provide an electromotive vehicle that gently changes decelerating force that changes as a result of an upshift.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
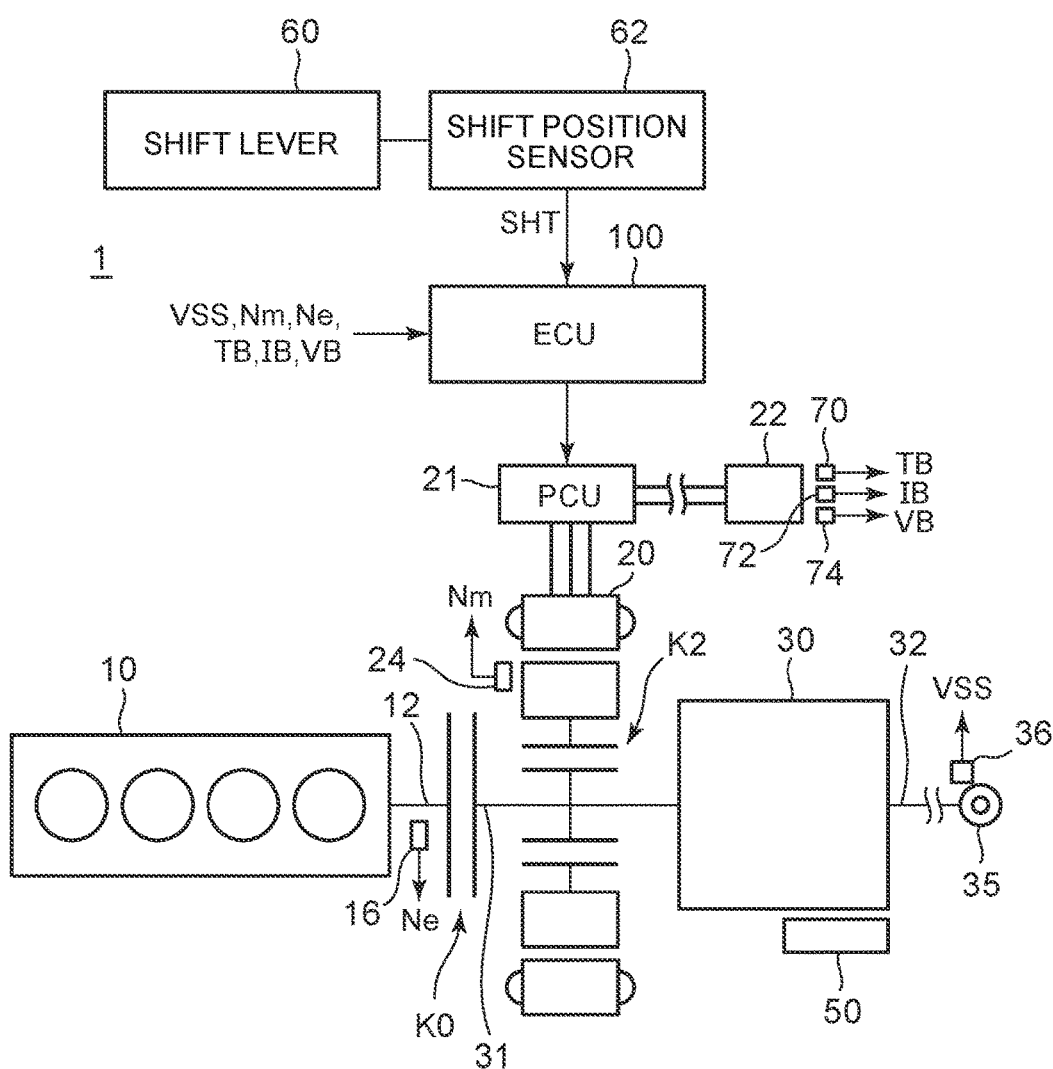
FIG. 1 is a block diagram that shows the overall configuration of an electromotive vehicle according to an embodiment.

Hereinafter, an embodiment of the disclosure will be described with reference to the accompanying drawings. In the following description, like reference numerals denote the same components. The names and functions of them are also the same. Therefore, the detailed description thereof will not be repeated.

FIG. 1 is an overall configuration view of a vehicle 1 according to the present embodiment. The vehicle 1 includes an engine 10, a motor generator (hereinafter, also referred to as "MG") 20, a power control circuit (hereinafter, referred to as power control unit (PCU)) 21, a high-voltage battery 22, an automatic transmission 30, drive wheels 35, a clutch K2, a clutch K0, a hydraulic circuit 50, and an electronic control unit (hereinafter, referred to as ECU) 100.

The vehicle 1 is a hybrid vehicle that travels by using the power of at least one of the engine 10 and the MG 20, which is transmitted to the drive wheels 35 via the automatic transmission 30. The engine 10 is an internal combustion engine, such as a gasoline engine and a diesel engine. An input shaft 31 of the automatic transmission 30 is coupled to an output shaft 12 of the engine 10 via the clutch K0. An output shaft 32 of the automatic transmission 30 is coupled to the drive wheels 35. The automatic transmission 30 may be a stepped automatic transmission, or may be a continuously variable automatic transmission. In the present embodiment, the automatic transmission 30 will be described on the assumption that the automatic transmission 30 has a plurality of speed positions, for example, first speed to sixth speed.

The MG 20 is typically a three-phase permanent magnet synchronous motor. That is, permanent magnets are embedded in the rotor of the MG 20. Three-phase coils (a U-phase coil, a V-phase coil and a W-phase coil) are wound in the stator of the MG 20. The other ends of the three-phase coils are connected to one another at a neutral point. The rotor of the MG 20 is hollow, and the input shaft 31 extends through the rotor.

In the present embodiment, one end of the input shaft 31 is connected to the clutch K0. The other end of the input shaft 31 is connected to the automatic transmission 30. The clutch K2 is provided between the radially inner side of the rotor of the MG 20 and the input shaft 31. That is, the rotor of the MG 20 is coupled to the input shaft 31 via the clutch K2.

The MG 20 is driven by high-voltage electric power that is supplied from the high-voltage battery 22 via the PCU 21. The MG 20 generates electric power by being rotated by power that is transmitted from the input shaft 31 of the automatic transmission 30 (power that is transmitted from the engine 10 or the drive wheels 35). The high-voltage battery 22 stores electric power with which the MG 20 that operates at high voltage is supplied.

The PCU 21 includes a converter and an inverter. The converter steps up voltage that is input from the high-voltage battery 22 and then outputs the stepped-up voltage to the inverter, or steps down voltage that is input from the inverter and then outputs the stepped-down voltage to the high-voltage battery 22. The inverter converts direct current, which is input from the converter, to three-phase alternating current and then outputs the three-phase alternating current to the MG 20, or converts three-phase alternating current, which is input from the MG 20, to direct current and then outputs the direct current to the converter.

The hydraulic circuit 50 regulates hydraulic pressure that is supplied from an electric oil pump or mechanical oil pump (not shown), and then supplies the hydraulic pressure to the automatic transmission 30, the clutch K2 and the clutch K0.

The clutch K2 according to the present embodiment is a so-called normally-closed (hereinafter, also referred to as N/C) clutch that is engaged in a normal state where no hydraulic pressure is supplied and that is released in a state where hydraulic pressure higher than or equal to a predetermined release hydraulic pressure P1. Similarly, the clutch K0 according to the present embodiment is an N/C clutch that is engaged in a normal state and that is released in a state where hydraulic pressure higher than or equal to a predetermined release hydraulic pressure P2 is supplied.

The vehicle 1 includes a plurality of sensors for detecting physical quantities that are required to control the vehicle 1, such as a user's operation amount of an accelerator pedal, a rotation speed (hereinafter, referred to as engine rotation speed) Ne of the engine 10, a rotation speed (hereinafter, referred to as MG rotation speed) Nm of the MG 20, and the like. For example, an engine rotation speed sensor 16 detects the engine rotation speed Ne. A resolver 24 detects the MG rotation speed Nm. A vehicle speed sensor 36 detects a vehicle speed VSS. These sensors transmit detected results to the ECU 100.

The vehicle 1 includes a shift lever 60. The shift lever 60 is an operating member that allows the driver to select any one of a plurality of shift positions. The plurality of shift positions include, for example, a parking position, a neutral position, a forward drive position, a reverse drive position and an L position. The L position is a shift position in which the speed position is fixed to first speed.

The shift lever 60 includes a shift position sensor 62 for detecting the position of the shift lever 60. The shift position sensor 62 transmits, to the ECU 100, a signal SHT indicating the position of the shift lever 60. The ECU 100 determines which one of the plurality of shift positions is selected on the basis of the signal SHT received from the shift position sensor 62.

A battery temperature sensor 70, a current sensor 72 and a voltage sensor 74 are provided in the high-voltage battery 22. The battery temperature sensor 70 detects a battery temperature TB of the high-voltage battery 22, and then transmits, to the ECU 100, a signal indicating a detected result. The current sensor 72 detects a current IB of the high-voltage battery 22 and then transmits, to the ECU 100, a signal indicating a detected result. The voltage sensor 74 detects a voltage VB of the high-voltage battery 22, and then transmits, to the ECU 100, a signal indicating a detected result.

The ECU 100 includes a central processing unit (CPU) (not shown) and an internal memory (not shown). The ECU 100 executes predetermined arithmetic processing on the basis of information from the sensors and information stored in the memory, and controls devices of the vehicle 1 on the basis of computed results.

Specifically, signals indicating detected results are input to the ECU 100 from the resolver 24 that detects the MG rotation speed Nm and the engine rotation speed sensor 16 that detects the engine rotation speed Ne.

The ECU 100 causes the vehicle 1 to travel in accordance with any one of a motor mode, a hybrid mode and an engine mode. In the case where the state of charge (SOC) of the high-voltage battery 22 is sufficiently high, when the vehicle 1 moves forward, the motor mode is selected at a low vehicle speed (for example, lower than or equal to 30 km/h), and the hybrid mode or the engine mode is selected at a high vehicle speed (for example, higher than or equal to 30 km/h). On the other hand, in the case where the SOC of the high-voltage battery 22 is low, the hybrid mode or the engine mode is selected irrespective of a vehicle speed.

When the motor mode is selected, the ECU 100 controls the vehicle 1 such that the input shaft 31 of the automatic transmission 30 is rotated by the power of the MG 20 by engaging the clutch K2 (coupling the MG 20 to the input shaft 31 of the automatic transmission 30) and releasing the clutch K0 (disconnecting the engine 10 from the input shaft 31 of the automatic transmission 30).

When the hybrid mode is selected, the ECU 100 controls the vehicle 1 such that the input shaft 31 of the automatic transmission 30 is rotated by the power of at least one of the engine 10 and the MG 20 by engaging the clutch K2 (coupling the MG 20 to the input shaft 31 of the automatic transmission 30) and engaging the clutch K0 (coupling the engine 10 to the input shaft 31 of the automatic transmission 30).

When the engine mode is selected, the ECU 100 controls the vehicle 1 such that the input shaft 31 of the automatic transmission 30 is rotated by the power of the engine 10 by releasing the clutch K2 (disconnecting the MG 20 from the input shaft 31 of the automatic transmission 30) and engaging the clutch K0 (coupling the engine 10 to the input shaft 31 of the automatic transmission 30). In this state, the MG 20 is disconnected from a powertrain, so the configuration of the vehicle 1 is similar to the configuration of a vehicle that includes the automatic transmission 30 between the engine 10 and the drive wheels 35 and that uses only the engine as a drive source.

The ECU 100 estimates the remaining amount of charge (in the following description, referred to as state of charge (SOC)) of the high-voltage battery 22 on the basis of the current IB, voltage VB and battery temperature TB of the high-voltage battery 22. The ECU 100 may, for example, estimate an open circuit voltage (OCV) on the basis of the current IB, the voltage VB and the battery temperature TB, and estimate the SOC of the high-voltage battery 22 on the basis of the estimated OCV and a predetermined map. Alternatively, the ECU 100 may, for example, estimate the SOC of the high-voltage battery 22 by integrating charge current and discharge current of the high-voltage battery 22.

When the ECU 100 controls the amount of charge and amount of discharge of the high-voltage battery 22, the ECU 100 sets an upper limit value of input electric power that is allowed at the time when the high-voltage battery 22 is charged (in the following description, referred to as charge power limit value Win) and an upper limit value of output power that is allowed at the time when the high-voltage battery 22 is discharged (in the following description, referred to as discharge power limit value Wout) on the basis of the battery temperature TB and the current SOC. For example, as the current SOC decreases, the discharge power limit value Wout is set so as to gradually decrease. On the other hand, as the current SOC increases, the charge power limit value Win is set so as to gradually decrease. In the present embodiment, both the discharge power limit value Wout and the charge power limit value Win are positive values for the sake of convenience of description; however, the discharge power limit value Wout may be treated as a positive value and the charge power limit value Win may be treated as a negative value.

A secondary battery that is used as the high-voltage battery 22 has such temperature dependency that the internal resistance increases at a low temperature. It is required to prevent an excessive rise in temperature due to further heating at a high temperature. For this reason, it is desirable to decrease each of the discharge power limit value Wout and charge power limit value Win at a low temperature and high temperature of the battery temperature TB. The ECU 100 sets the charge power limit value Win and the discharge power limit value Wout by using, for example, a map, or the like, in response to the battery temperature TB and the current SOC.

In the thus configured vehicle 1, for example, the case where the hybrid mode is selected and the vehicle 1 is traveling is assumed. At this time, when the low speed-side speed ratio (speed position) is established (for example, L position is selected) in the automatic transmission 30, the MG rotation speed Nm may increase with an increase in vehicle speed. In such a case, when the rotation speed of the MG 20 reaches an upper limit value (rotation limit value) that takes durability into consideration, the rotation speed of the input shaft 31 of the automatic transmission 30 may be decreased by automatically upshifting the automatic transmission 30.

However, as a result of a decrease in the rotation speed of the input shaft 31 of the automatic transmission 30 through an upshift, so-called engine brake force that utilizes the rotation resistance of the output shaft of the engine 10 may reduce, and decelerating force that acts on the vehicle 1 may reduce. In such a case, it is conceivable to keep the decelerating force of the vehicle 1 before and after an upshift by generating negative torque with the use of the MG 20; however, for example, when the input electric power of the high-voltage battery 22 is limited due to, for example, the fact that the SOC of the high-voltage battery 22 is a full charge state, it may be difficult to generate negative torque that is required to reduce a change in decelerating force. For this reason, when decelerating force that acts on the vehicle 1 changes before and after an upshift, the drivability of the vehicle 1 may deteriorate.

In the present embodiment, when the ECU 100 executes upshift control in the automatic transmission 30 and the charge power limit value Win that is the upper limit value of the input electric power that is allowed at the time when the high-voltage battery 22 is charged is smaller than a threshold Win(0), the ECU 100 controls the MG 20 such that the torque of the MG 20 gradually increases by the time the upshift control completes, that is, decelerating force that acts on the vehicle 1 becomes decelerating force reduced as a result of the upshift control.

With this configuration, it is possible to gently change the decelerating force of the vehicle 1, which changes as a result of an upshift.

For example, when the MG rotation speed Nm reaches a rotation speed threshold Nm(0) lower than the rotation limit value, the ECU 100 executes upshift control. In the present embodiment, for example, when the shift position is the L position, and when the MG rotation speed Nm reaches the rotation speed threshold Nm(0), the ECU 100 executes upshift control.

When the ECU 100 executes upshift control and when the charge power limit value Win is larger than the threshold value Win(0), the ECU 100 allows generation of negative torque that is output from the MG 20.

The ECU 100 controls the MG 20 such that torque output of the MG 20 stops at the same time as the upshift control completes.

Figure 2:
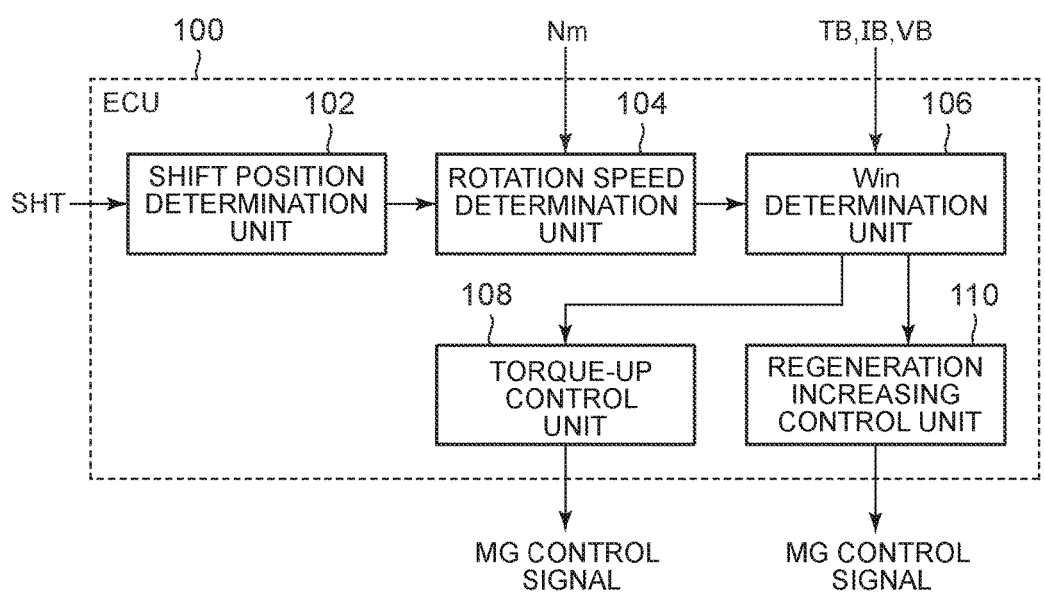
FIG. 2 is a functional block diagram of an ECU.

FIG. 2 shows the functional block diagram of the ECU 100 mounted on the vehicle 1 according to the present embodiment. The ECU 100 includes a shift position determination unit 102, a rotation speed determination unit 104, a Win determination unit 106, a torque-up control unit 108 and a regeneration increasing control unit 110. These components may be implemented by software, such as programs, or may be implemented by hardware.

The shift position determination unit 102 determines whether the current shift position is the L position. The shift position determination unit 102, for example, determines whether the current shift position is the L position on the basis of the signal SHT that indicates a detected result and that is received from the shift position sensor 62.

When the shift position determination unit 102 determines that the current shift position is the L position, the rotation speed determination unit 104 determines whether the MG rotation speed Nm that is received from the resolver 24 is higher than or equal to the threshold Nm(0). The threshold Nm(0) is lower than an upper limit value Nm(1) of the MG rotation speed Nm. The threshold Nm(0) may be a predetermined rotation speed or may be set on the basis of an ambient temperature, an oil temperature, or the like. The upper limit value Nm(1) is the above-described rotation limit value of the MG rotation speed Nm.

When the rotation speed determination unit 104 determines that the MG rotation speed Nm is higher than the threshold Nm(0), the Win determination unit 106 determines whether the charge power limit value Win of the high-voltage battery 22 is larger than the threshold Win(0). As described above, the threshold Win(0) is a value for determining whether generation of negative torque that is output from the MG 20 is allowed. The charge power limit value Win is, for example, determined on the basis of the SOC, or the like, as described above.

When the Win determination unit 106 determines that the charge power limit value Win is smaller than or equal to the threshold Win(0), the torque-up control unit 108 executes torque-up control. The torque-up control is control for gradually increasing the output torque of the MG 20.

In the present embodiment, the torque-up control unit 108 increases the output torque of the MG 20 at a predetermined rate of increase from a point in time at which it is determined that the MG rotation speed Nm is higher than the threshold Nm(0) with torque (for example, zero) at that point in time as an initial value.

The predetermined rate of increase is, for example, set such that the decelerating force of the vehicle 1 becomes decelerating force after an upshift by the time the decelerating force reaches the upper limit value Nm(1) after the MG rotation speed Nm exceeds the threshold Nm(0). Therefore, the predetermined rate of increase may be, for example, set on the basis of a rate of increase up to timing just before a point in time at which the MG rotation speed Nm exceeds the threshold Nm(0) (for example, the amount of increase in MG rotation speed Nm in a predetermined period up to the threshold Nm(0) as end timing). For example, the rate of increase in the output torque of the MG 20 may be set so as to be higher as the rate of increase in the MG rotation speed Nm increases.

The torque-up control unit 108 upshifts (for example, shifts from first speed to second speed) the speed position of the automatic transmission 30 when the MG rotation speed Nm reaches the upper limit value Nm(1) The torque-up control unit 108 executes torque-up control until the upshift of the speed position of the automatic transmission 30 completes. The torque-up control unit 108 ends torque-up control by stopping the output of torque of the MG 20 at a point in time at which the upshift of the speed position of the automatic transmission 30 has completed. The torque-up control unit 108 generates an MG control signal for controlling the MG 20, and outputs the generated MG control signal to the PCU 21.

When the Win determination unit 106 determines that the charge power limit value Win is larger than the threshold Win(0), the regeneration increasing control unit 110 executes regeneration increasing control. The regeneration increasing control unit 110, for example, upshifts (for example, shifts from first speed to second speed) the speed position of the automatic transmission 30 at a point in time at which the MG rotation speed Nm reaches the upper limit value Nm(1). The regeneration increasing control unit 110 generates negative torque in the MG 20 after completion of the upshift. The regeneration increasing control unit 110, for example, increases negative torque such that decelerating force that acts on the vehicle 1 is kept before and after the upshift.

Figure 3:
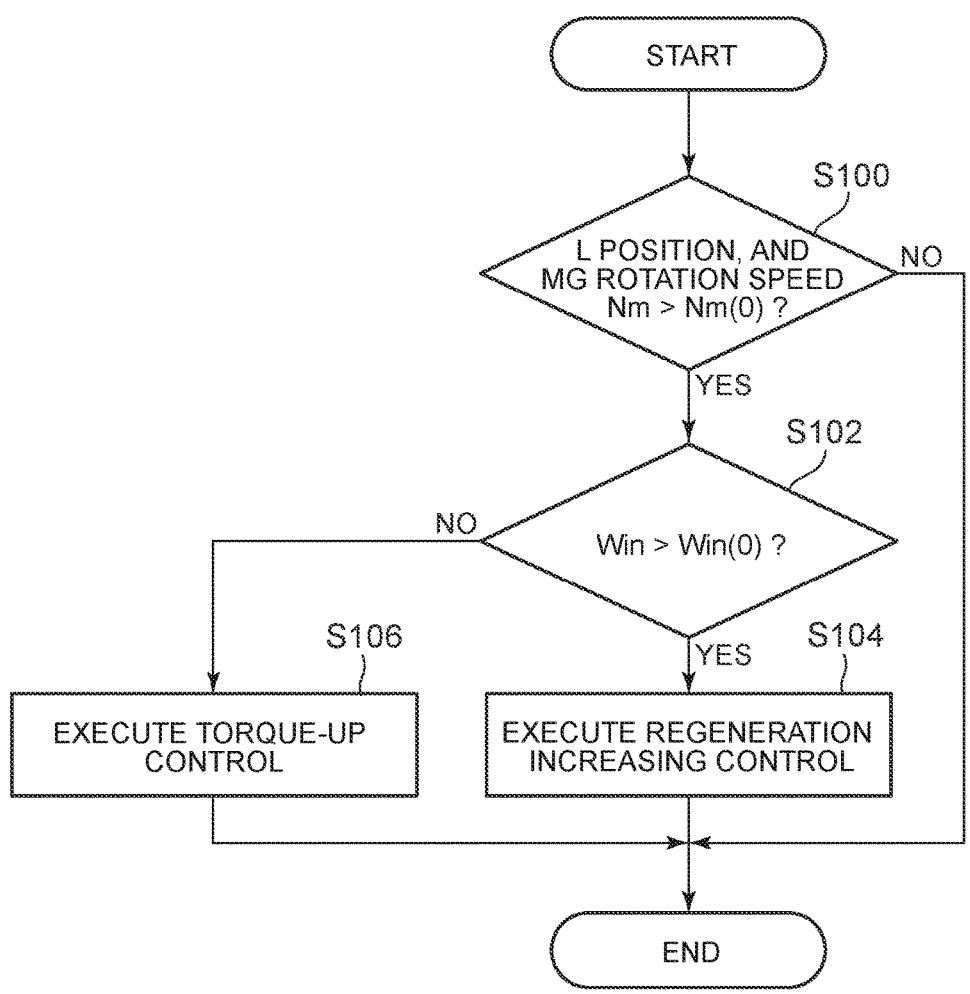
FIG. 3 is a flowchart that shows a control process that is executed by the ECU.

A control process that is executed by the ECU 100 mounted on the vehicle 1 according to the present embodiment will be described with reference to FIG. 3.

In step (hereinafter, step is abbreviated as S) 100, the ECU 100 determines whether the shift position is the L position and the MG rotation speed Nm is higher than the threshold Nm(0). When it is determined that the shift position is the L position and the MG rotation speed Nm is higher than the threshold Nm(0) (YES in S100), the process proceeds to S102. Otherwise (NO in S100), the process ends.

In S102, the ECU 100 determines whether the charge power limit value Win is larger than the threshold Win(0). When it is determined that the charge power limit value Win is larger than the threshold Win(0) (YES in S102), the process proceeds to S104. Otherwise (NO in S102), the process proceeds to S106.

In S104, the ECU 100 executes regeneration increasing control. In S106, the ECU 100 executes torque-up control.

The operation of the ECU 100 mounted on the vehicle 1 according to the present embodiment based on the above-described structure and flowchart will be described with reference to FIG. 4 and FIG. 5.

Figure 4:
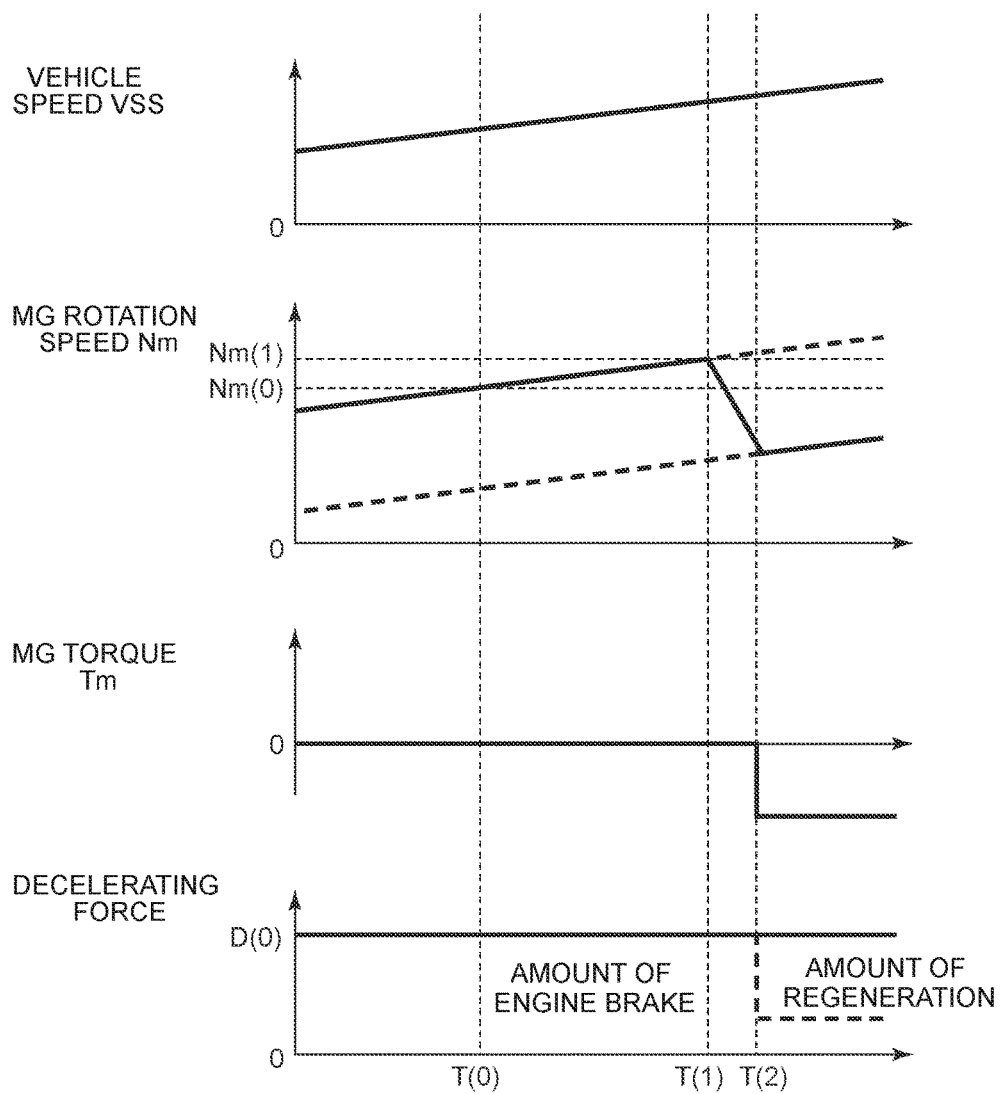
FIG. 4 is a timing chart that shows the operation of the ECU in the case where regeneration increasing control at the time of an upshift.

FIG. 4 shows the operation of the ECU 100 in the case where regeneration increasing control is executed at the time of an upshift. FIG. 5 shows the operation of the ECU 100 in the case where torque-up control is executed at the time of an upshift.

More specifically, the ordinate axis of the uppermost graph of FIG. 4 represents the vehicle speed VSS, the ordinate axis of the second graph from the upper side of FIG. 4 represents the MG rotation speed Nm, the third graph from the upper side of FIG. 4 represents the torque of the MG 20, and the ordinate axis of the lowermost graph of FIG. 4 represents decelerating force that acts on the vehicle 1. The abscissa axis of each graph of FIG. 4 represents time. FIG. 5 is similar to FIG. 4, so the detailed description thereof will not be repeated.

Referring to FIG. 4, for example, it is assumed that the vehicle 1 is traveling on a downhill in a state where the L position is selected as the shift position. At this time, it is assumed that the charge power limit value Win is larger than the threshold Win(0). Here, depression of an accelerator pedal is released.

In this case, a constant decelerating force D(0) based on engine brake force is acting on the vehicle 1. Because the vehicle 1 is traveling on a downhill, the speed of the vehicle 1 increases even when the constant decelerating force D(0) is acting on the vehicle 1. The MG rotation speed Nm also increases with an increase in the speed of the vehicle 1. As a result, at time T(0), the MG rotation speed Nm becomes higher than the threshold Nm(0). When the shift position is the L position (YES in S100) and when the charge power limit value Win is larger than the threshold Win(0) (YES in S102), regeneration increasing control is executed (S104).

That is, when the MG rotation speed Nm reaches the upper limit value Nm(1) at time T(1), an upshift is carried out in the automatic transmission 30 (selection of the L position is cancelled and the shift position is shifted into second speed), and the MG rotation speed Nm starts reducing toward a value corresponding to the speed position after the upshift (for example, second speed) (a value that is set in response to a vehicle speed as indicated by the dashed line of the second graph from the upper side of FIG. 4).

At time T(2), as shown in the lowermost graph of FIG. 4, the negative torque of the MG 20 is generated at a point in time at which engine brake force after the upshift acts on the vehicle 1. Thus, a reduction in engine brake force due to the upshift is compensated by negative torque that is output from the MG 20, so, as indicated by the continuous line in the lowermost graph of FIG. 4, decelerating force that acts on the vehicle 1 is kept before and after the upshift.

Figure 5:
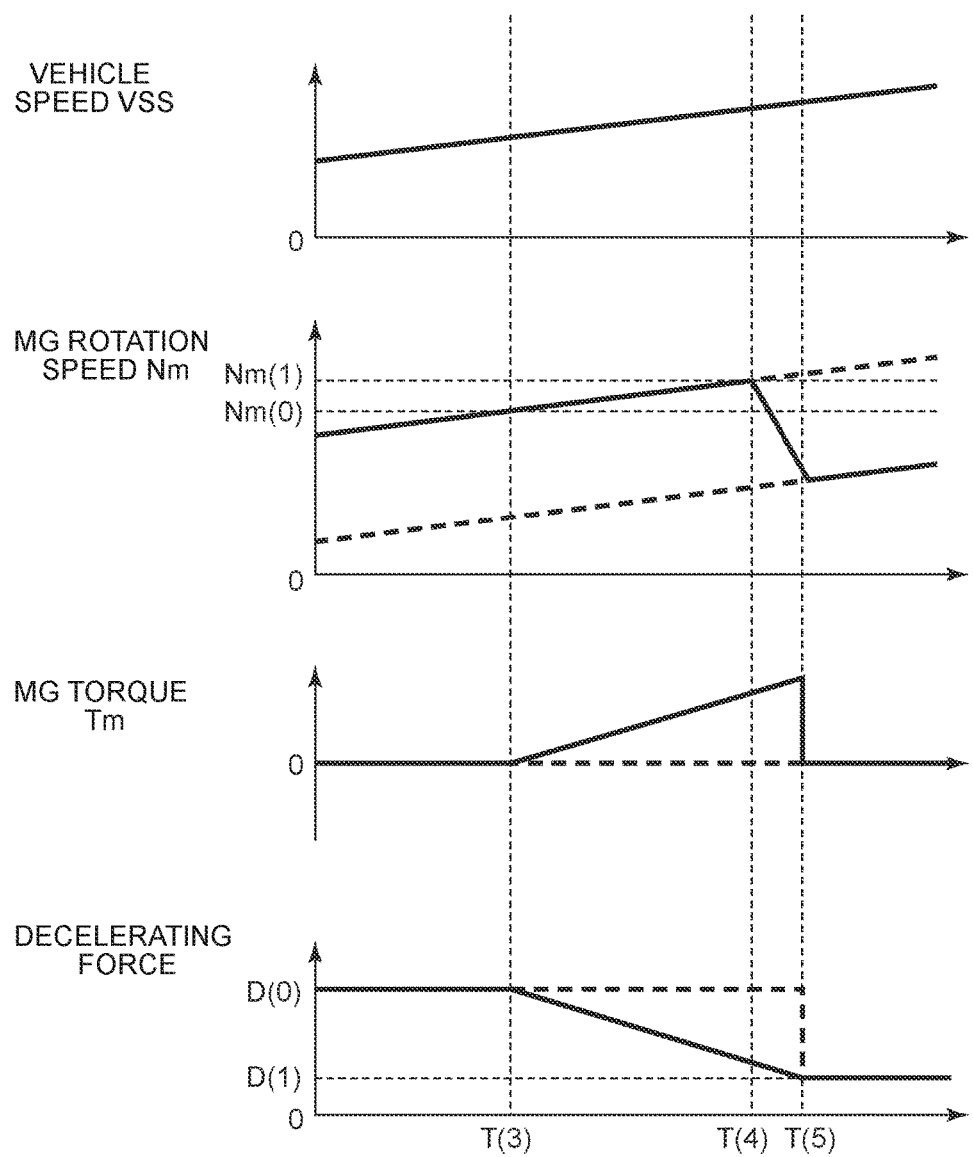
FIG. 5 is a timing chart that shows the operation of the ECU in the case where torque-up control is executed at the time of an upshift.

Next, referring to FIG. 5, for example, as in the case of FIG. 4, the case where the vehicle 1 is traveling on a downhill in a state where the L position is selected as the shift position is assumed. At this time, it is assumed that the charge power limit value Win is smaller than the threshold Win(0) because the SOC is close to the full charge state. Depression of the accelerator pedal is released.

In this case, the constant decelerating force D(0) based on engine brake force is acting on the vehicle 1. Because the vehicle 1 is traveling on a downhill, the speed of the vehicle 1 increases even when the decelerating force is acting on the vehicle 1. The MG rotation speed Nm also increases with an increase in the speed of the vehicle 1. As a result, at time T(3), the MG rotation speed Nm becomes higher than the threshold Nm(0). When the shift position is the L position and the MG rotation speed Nm is higher than the threshold Nm(0) (YES in S100) and when the charge power limit value Win is smaller than the threshold Win(0) (NO in S102), torque-up control is executed (S106).

That is, an increase in the torque (positive torque) of the MG 20 is started at a predetermined rate of increase from time T(3) at which it is determined that the MG rotation speed Nm is higher than the threshold Nm(0). As the torque of the MG 20 increases, decelerating force that acts on the vehicle 1 reduces.

When the MG rotation speed Nm reaches the upper limit value Nm(1) at time T(4), an upshift is carried out in the automatic transmission 30 (selection of the L position is cancelled and the shift position is shifted into second speed), and the MG rotation speed Nm starts reducing toward a value corresponding to the speed position after the upshift (for example, second speed).

The torque of the MG 20 becomes zero at time T(5) at which the upshift has completed, so decelerating force D(1) based on engine brake force acts on the vehicle 1.

As described above, with the electromotive vehicle according to the present embodiment, when upshift control is executed and the charge power limit value Win of the high-voltage battery 22 is smaller than the threshold Win(0), the torque of the MG 20 is gradually increased by the time the upshift control completes, that is, the decelerating force of the vehicle 1 becomes decelerating force reduced as a result of the upshift control. Thus, it is possible to gently change the decelerating force of the vehicle 1, which changes as a result of an upshift. As a result, it is possible to reduce the deterioration of drivability of the vehicle. Therefore, it is possible to provide an electromotive vehicle that gently changes decelerating force that changes as a result of an upshift.

Upshift control is executed at a point in time at which the MG rotation speed Nm reaches the threshold Nm(0) lower than the upper limit value Nm(1). For this reason, it is possible to change the decelerating force of the vehicle 1 to decelerating force after the upshift control by gradually increasing the torque of the MG 20 in advance at the time when the speed position is changed in the automatic transmission 30. Thus, it is possible to gently change the decelerating force of the vehicle 1, which changes as a result of an upshift.

When upshift control is executed and when the charge power limit value Win of the high-voltage battery 22 is larger than the threshold Win(0), generation of negative torque that is output from the MG 20 is allowed. For this reason, it is possible to reduce a change in decelerating force resulting from an upshift by using negative torque that is output from the MG 20. On the other hand, when the charge power limit value Win is smaller than or equal to the threshold Win(0), it is possible to gently change the decelerating force of the vehicle, which changes as a result of an upshift, by gradually increasing the torque of the MG 20.

Because the MG 20 is controlled such that the torque output of the MG 20 is stopped at the same time as upshift control completes, it is possible to reduce a change in the decelerating force of the vehicle 1 after completion of the upshift control. Specifically, when the torque output of the MG 20 is stopped in a state where the torque of the MG 20 is increased, decelerating force changes to increase. On the other hand, when an upshift is carried out, decelerating force changes to reduce. Therefore, when the torque output of the MG 20 is stopped at the same time as an upshift completes, it is possible to gently change decelerating force, which reduces as a result of an upshift, by stopping the torque output of the MG 20. As a result, it is possible to reduce a change in decelerating force that acts on the vehicle 1.

Hereinafter, alternative embodiments will be described. In the present embodiment, the ECU 100 linearly changes the output torque of the MG 20; however, the disclosure is not specifically limited to the configuration that the output torque of the MG 20 is linearly changed. For example, the output torque of the MG 20 may be nonlinearly changed.

In the present embodiment, when the MG rotation speed Nm becomes higher than Nm(0) in the case where the shift position is the L position, regeneration increasing control or torque-up control is executed in response to the charge power limit value Win; however, the disclosure is not specifically limited to the case where the shift position is the L position. For example, in the case where the speed position is first speed or second speed in manual shift mode, the case where the speed position is first speed or second speed in automatic shift mode, or the case where the speed ratio (for example, the speed ratio at the start of movement) is fixed in a continuously variable transmission, when the MG rotation speed Nm becomes higher than the threshold Nm(0), the speed ratio of the automatic transmission 30 may be upshifted in response to the charge power limit value Win, and regeneration increasing control or torque-up control may be executed.

In the present embodiment, the case where the speed position before a shift and the speed position after the shift are respectively first speed and second speed is described as an example; however, the speed position before a shift and the speed position after the shift are not specifically limited to first speed and second speed, respectively. The speed position before a shift and the speed position after the shift may be, for example, third speed and fourth speed, respectively, may be fourth speed and fifth speed, respectively, or may be third speed and fifth speed, respectively.

In the present embodiment, the hybrid vehicle that uses the MG 20 and the engine 10 as the drive sources is described as an example; however, the vehicle just needs to be an electromotive vehicle that uses the MG 20 as a drive source. For example, the vehicle may be an electric vehicle or may be a hybrid vehicle that uses a plurality of (for example, two) motor generators and an engine.

All or part of the above-described alternative embodiments may be combined with each other. The embodiment described above is illustrative and not restrictive in all respects. The scope of the present subject matter is defined by the appended claims rather than the above description. The scope of the present subject matter is intended to encompass all modifications within the scope of the appended claims and equivalents thereof.

What is claimed is:

1. An electromotive vehicle comprising:
an electrical storage device;
a rotary electric machine serving as a drive source of a vehicle and a generating source for generating electric power, the rotary electric machine being configured to exchange electric power with the electrical storage device;
a transmission device including an input shaft and an output shaft, a rotary shaft of the rotary electric machine being connected to the input shaft, a drive wheel being connected to the output shaft, the transmission device being configured to be able to change a rotation speed of the input shaft and then transmit the changed rotation speed to the output shaft;
an engine serving as a drive source of the vehicle, the engine being connected to the input shaft of the transmission device; and
an electronic control unit configured to control an operation of the rotary electric machine and an operation of the transmission device, wherein
the electronic control unit is configured to, when decelerating force acts on the vehicle due to engine brake force of the engine and upshift control is executed in the transmission device and when an upper limit value of input electric power that is allowed at the time of charging the electrical storage device is smaller than a threshold, control the rotary electric machine such that torque of the rotary electric machine gradually increases by the time the upshift control completes, at which the decelerating force that acts on the vehicle becomes decelerating force reduced as a result of the upshift control.

2. The electromotive vehicle according to claim 1, wherein
the electronic control unit is configured to, when the rotation speed of the rotary electric machine reaches a rotation speed threshold lower than a rotation limit value, execute the upshift control.

3. The electromotive vehicle according to claim 1, wherein
the electronic control unit is configured to, when the upper limit value is larger than the threshold in a case where the upshift control is executed, allow generation of negative torque that is output from the rotary electric machine.

4. The electromotive vehicle according to claim 1, wherein
the electronic control unit is configured to control the rotary electric machine such that torque output of the rotary electric machine stops at the same time as the upshift control completes.

* * * * *